US010212381B2

(12) United States Patent
Kabuto et al.

(10) Patent No.: US 10,212,381 B2
(45) Date of Patent: *Feb. 19, 2019

(54) IMAGE TRANSFER APPARATUS WITH CEC COMMUNICATION FUNCTION

(71) Applicant: Maxell, Ltd., Kyoto (JP)

(72) Inventors: Nobuaki Kabuto, Kunitachi (JP); Yasutaka Tsuru, Yokohama (JP); Yuya Ogi, Yokohama (JP)

(73) Assignee: Maxell, Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/860,916

(22) Filed: Jan. 3, 2018

(65) Prior Publication Data

US 2018/0124349 A1    May 3, 2018

Related U.S. Application Data

(63) Continuation of application No. 15/494,952, filed on Apr. 24, 2017, now Pat. No. 9,894,310, which is a
(Continued)

(30) Foreign Application Priority Data

Dec. 7, 2007    (JP) ................................ 2007-316528

(51) Int. Cl.
*H04N 5/38* (2006.01)
*G09G 5/00* (2006.01)
(Continued)

(52) U.S. Cl.
CPC ............... *H04N 5/38* (2013.01); *G09G 5/006* (2013.01); *H04N 13/161* (2018.05);
(Continued)

(58) Field of Classification Search
CPC ......... G09G 2370/047; G09G 2370/12; G09G 2370/16; G09G 5/006; H04N 13/0048;
(Continued)

(56) References Cited

U.S. PATENT DOCUMENTS 7,761,709 B2 *  7/2010  Choi ................... G06F 13/4081
                                                          380/201
7,889,201 B2 *  2/2011  Yato ....................... G09G 5/006
                                                          345/501
(Continued)

FOREIGN PATENT DOCUMENTS

CN          1823520         8/2006
JP          08307544        11/1996
(Continued)

OTHER PUBLICATIONS

High Definition Multimedia Interface Specification Version 1.3a, Nov. 10, 276 pages.
(Continued)

*Primary Examiner* — Jessica M Prince
(74) *Attorney, Agent, or Firm* — Mattingly & Malur, PC

(57) ABSTRACT

A video transmitting apparatus including: a first register that is set when receiving a CEC (Consumer Electronics Control) message which is transmitted by a video signal source and is reset in response to a leading edge of a predetermined voltage that is supplied from said video signal source; and a second register which reads an EDID (Extended Display Identification Data) of a video displaying apparatus, is set when a decision is made that said video displaying apparatus is a predetermined video displaying apparatus, and is reset when a state where an HPD (Hot Plug Detect) is in a state of low has continued for a predetermined period of time or longer, wherein when both of said first and second registers have been set, a determination is made that said video signal (Continued)

source, said video transmitting apparatus, and said video displaying apparatus have been connected.

3 Claims, 4 Drawing Sheets

Related U.S. Application Data continuation of application No. 13/914,717, filed on Jun. 11, 2013, now Pat. No. 9,674,474, which is a continuation of application No. 12/326,930, filed on Dec. 3, 2008, now Pat. No. 8,462,843.

(51) Int. Cl.
| | |
|---|---|
| *H04N 21/4363* | (2011.01) |
| *H04N 19/61* | (2014.01) |
| *H04N 13/172* | (2018.01) |
| *H04N 13/194* | (2018.01) |
| *H04N 13/161* | (2018.01) |

(52) U.S. Cl.
CPC ......... *H04N 13/172* (2018.05); *H04N 13/194* (2018.05); *H04N 19/61* (2014.11); *H04N 21/43635* (2013.01); *H04N 21/43637* (2013.01); *G09G 2370/045* (2013.01); *G09G 2370/047* (2013.01); *G09G 2370/12* (2013.01); *G09G 2370/16* (2013.01)

(58) Field of Classification Search
CPC ........... H04N 13/0059; H04N 13/0062; H04N 21/43635; H04N 21/43637; H04N 5/38
See application file for complete search history.

(56) References Cited

U.S. PATENT DOCUMENTS

| | | | |
|---|---|---|---|
| 8,564,642 | B2 | 10/2013 | Kazuyoshi |
| 2002/0057333 | A1 | 5/2002 | Mayuzumi |
| 2006/0143679 | A1 | 6/2006 | Yamada et al. |
| 2006/0280055 | A1* | 12/2006 | Miller .................... G09G 5/006 369/44.11 |
| 2007/0036158 | A1 | 2/2007 | Hun-Kwon |
| 2007/0057931 | A1 | 3/2007 | Takamori |
| 2007/0236605 | A1 | 10/2007 | Saito |
| 2008/0126591 | A1* | 5/2008 | Kwon .................... H04N 5/775 710/15 |
| 2009/0015723 | A1 | 1/2009 | Doumuki |

FOREIGN PATENT DOCUMENTS

| | | |
|---|---|---|
| JP | 200258005 | 2/2002 |
| JP | 2004165921 | 6/2004 |
| JP | 2007214952 | 8/2007 |

OTHER PUBLICATIONS

CN Office Action for Chinese Application No. 201110034964.4, dated Jul. 15, 2013.
JP Office Action for Japanese Application No. 2007-316528, dated Oct. 18, 2011 with English Language Translation.
Decision for Refusal for Japanese Application No. 2007-316528, dated Dec. 6, 2011 with English Language Translation.
JP Office Action for Japanese Application No. 2007-316528, dated Jan. 22, 2013 with English Language Translation.
JP Office Action for Japanese Patent Application No. 2012-4104, dated Jan. 22, 2013.
"A DTV Profile for Uncompressed High Speed Digital Interfaces" CEA-861-B, Consumer Electronics.
"High-Definitation Multimedia Interface Specification", Informational Version 1.0. HDMI LLC, Sep. 2003.

\* cited by examiner

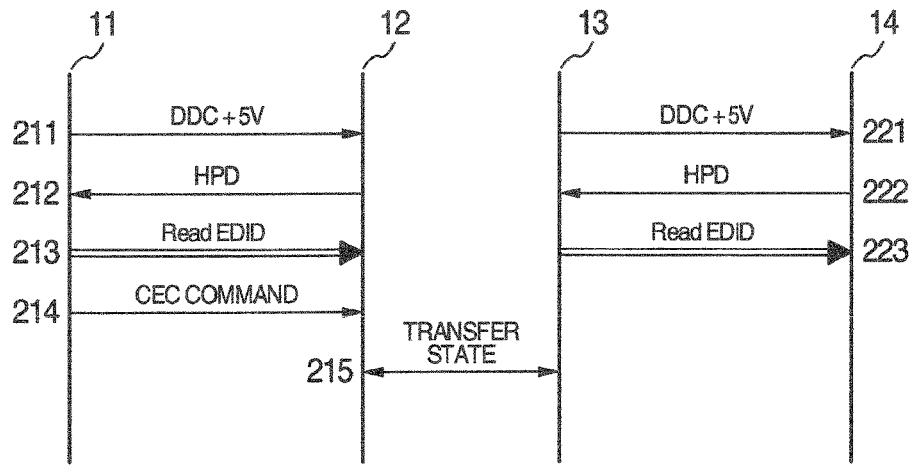
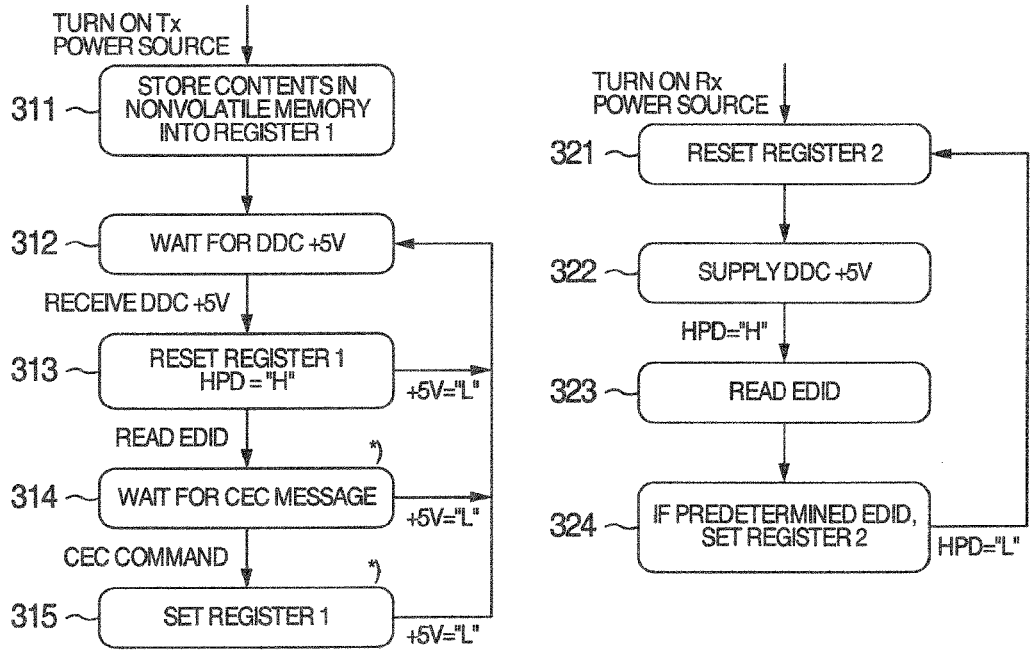

FIG.4
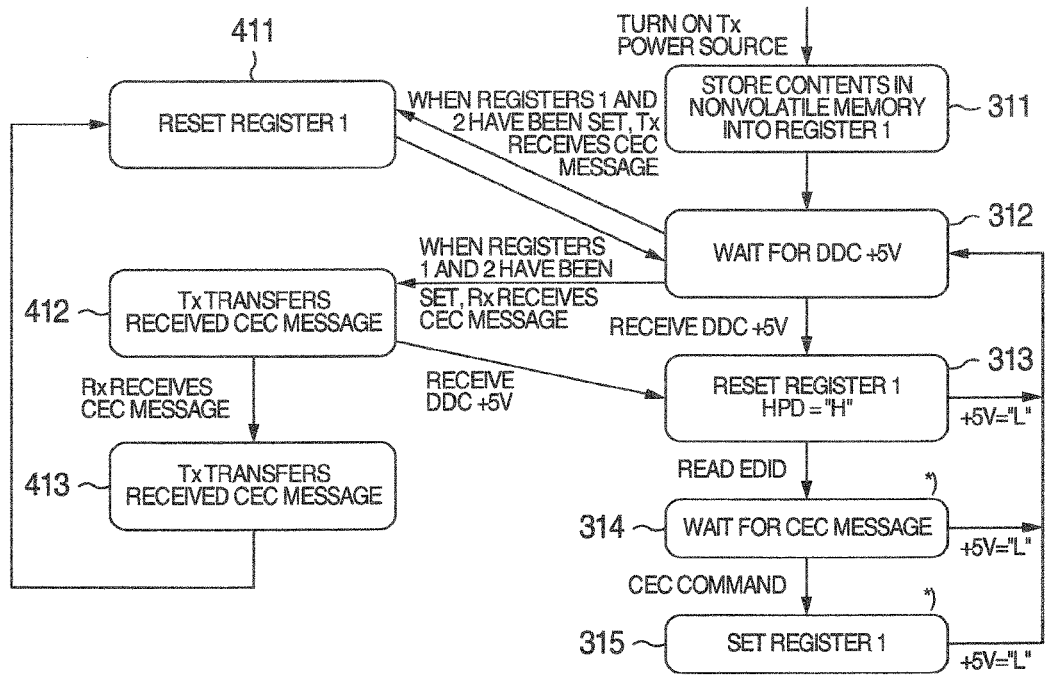
*) WHEN THE VALUE IN THE REGISTER 1 AND THE VALUE IN THE NONVOLATILE MEMORY DIFFER FOR A PREDETERMINED TIME, WRITE THE STATE IN THE REGISTER 1 INTO THE NONVOLATILE MEMORY
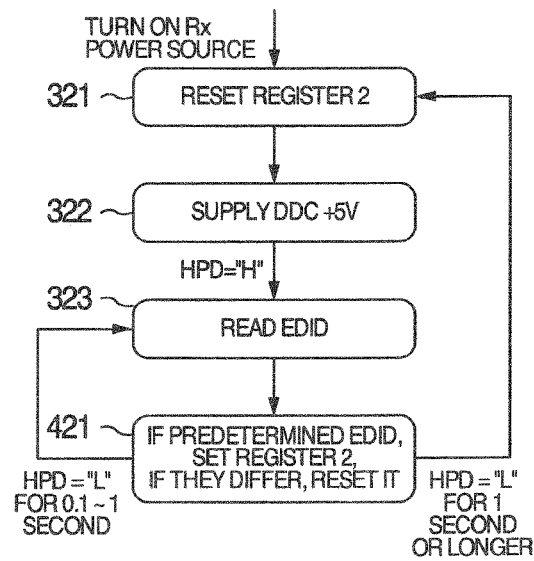

IMAGE TRANSFER APPARATUS WITH CEC COMMUNICATION FUNCTION

CROSS REFERENCE TO RELATED APPLICATION

This application is a continuation application of U.S. Ser. No. 15/494,952, filed Apr. 24, 2017, which is a continuation of U.S. Ser. No. 13/914,717, filed Jun. 11, 2013, now U.S. Pat. No. 9,674,474, which is a continuation application of U.S. Ser. No. 12/326,930, filed Dec. 3, 2008, now U.S. Pat. No. 8,462,843. This application relates to and claims priority from Japanese Patent Application No. 2007-316528, filed on Dec. 7, 2007. The entirety of the contents and subject matter of all of the above is incorporated herein by reference.

BACKGROUND OF THE INVENTION

The invention relates to a video signal transmitting apparatus for inputting a video signal output of a video signal source, processing the video signal, and outputting to a displaying apparatus.

An example of a video signal transmitting apparatus for video-compressing a video signal of a video signal source and, thereafter, radio-transmitting to a displaying apparatus has been disclosed in JP-A-2004-165921.

As a digital video interface between apparatuses, there is an HDMI (High-Definition Multimedia Interface) disclosed in "High-Definition Multimedia Interface Specification, Informational Version 1.0, HDMI, LLC, USA, 2003/9/4". In the HDMI, a CEC (Consumer Electronics Control) has been determined as a communication specification between the apparatuses using lines in an HDMI cable. An example of making control between the apparatuses by using a CEC message for transferring control information and apparatus information of the connected apparatus in the CEC standard has been disclosed in JP-A-2007-214952.

In the HDMI, such a technique that the video signal source reads EDID (Extended Display Identification Data) information showing display ability and specification of a video displaying apparatus and selects a format of an output video signal has been disclosed in "A DTV Profile for Uncompressed High Speed Digital Interfaces CEA-861B, Consumer Electronics Association, USA, May 2002". Such a technique that as timing when the signal source reads the EDID information, an HPD (Hot Plug Detect) signal in which a state where the cable has been connected is shown by a logic level "H" is used and such timing is set to timing after the logic level was changed from "L" to "H" has been disclosed in "High-Definition Multimedia Interface Specification, Informational Version 1.0, HDMI, LLC, USA, 2003 Sep. 4". By using those mechanisms, the specification of the video displaying apparatus can be transferred to the video signal transmitting apparatus and the specification of the video signal transmitting apparatus can be transferred to the video signal source.

SUMMARY OF THE INVENTION

In the case of radio-transmitting the video signal, since a transmitting speed is often lower than that of the wired connection, as disclosed in JP-A-2004-165921, a transmission amount is reduced by using video compression and the signal is transmitted. In order to raise a video compression ratio while keeping high picture quality, it is necessary to execute an advanced video process before the video compression and to also execute a video process for compensating a picture quality deterioration peculiar to the video compression in the case of decoding the signal on a reception side.

The video process before the video compression is executed by a video processing unit provided for the video signal source and the video process after the decoding is executed by a video processing unit provided for the displaying apparatus, so that the video signal transmitting apparatus which plays a role of the radio transmission can execute the advanced video compression. To make such a processing method function, a predetermined video signal source, the video transmitting apparatus, and the video signal displaying apparatus have to be connected.

As shown in "A DTV Profile for Uncompressed High Speed Digital Interfaces CEA-861B, Consumer Electronics Association, USA, May 2002", the HDMI has a mechanism for directly transferring the specification of the video displaying apparatus to the video transmitting apparatus by the mechanism of EDID. To transfer the specification of the video signal source to the video transmitting apparatus, it is considered to use a physical address included in the CEC message.

However, when the CEC message is transmitted in a wireless manner, there is a problem disclosed in JP-A-2004-165921 and a special mechanism is needed. Therefore, there is a case where the user does not want to install the CEC message. Further, in order to rapidly know a change in apparatus and make optimum control, it is necessary not only to read the EDID at the timing of the HPD and obtain the apparatus specification in response to the arrival of the CEC message but also to detect the time when the connecting state is cancelled. However, a specific mechanism for it is not shown.

It is an object of the invention to solve the foregoing problems and to provide a video transmitting apparatus which can promptly and certainly detect without an error a fact that a predetermined video signal source and a predetermined displaying apparatus have directly been connected to an input and an output of the video transmitting apparatus, respectively.

The invention comprises a first register that is set when receiving a CEC message which a video signal source reads an EDID of a video transmitting apparatus and issues and is reset in response to a leading edge of 5V that is supplied from the video signal source and a second register which reads an EDID of a video displaying apparatus, is set when it is decided that the video displaying apparatus is a predetermined video displaying apparatus, and is reset when a state where an HPD is in a state of "L" has continued for a predetermined period of time or longer and is characterized in that only when both of the first and second registers have been set, it is determined that the predetermined video signal source, the video transmitting apparatus, and the video displaying apparatus have directly been connected.

Further, there is such a second feature that in the case where the first register is a register which is initialized when a power source is OFF, after the state change of the first register, if such a state continued for a predetermined time, the state of the first register is stored into a nonvolatile memory, the power source of the video transmitting apparatus is turned off, and the first register is initialized, and when the power source has been turned on again, the state of the nonvolatile memory is returned to the first register.

In the case where the video transmitting apparatus is a radio apparatus, since a video process for converting into a video signal which can be easily and highly video-compressed can be executed in the video signal source, the video transmitting apparatus can execute a high compression video process, and the video displaying apparatus can execute a video process for suppressing a picture quality deterioration that is peculiar to a high compression video image, the high picture quality can be realized within a range of a limited transmission speed. The invention also has such a feature that when either the video signal source or the video displaying apparatus is not a predetermined apparatus, if the high picture quality realizing process is executed, since there is a case where it results in a reverse effect, a standard video compressing process which does not need special video processes before and after the high picture quality realizing process is executed.

There is such a feature that since the invention functions as a video transmitting apparatus for transmitting a specific CEC message only when the predetermined video signal source and the video displaying apparatus are connected to a radio transmission side and a radio reception side and stopping the transmission of the specific CEC message to other apparatuses, it is possible to prevent an influence such as a busneck or the like due to the transmission of the specific CEC message from being exerted on a CEC general apparatus.

Since the video transmitting apparatus to which the invention is applied can detect, at accurate timing, that the predetermined video signal source and the video displaying apparatus have respectively directly been connected to its input/output terminals, a video transmitting system in which the optimum video process has been executed to each of them can be constructed and a special control signal transmitting function can be provided.

Other objects, features and advantages of the invention will become apparent from the following description of the embodiments of the invention taken in conjunction with the accompanying drawings.

BRIEF DESCRIPTION OF THE DRAWINGS

FIG. 2 is a diagram showing a control sequence in the first embodiment of the invention;

FIG. 3 is a state transition diagram of the video transmitting apparatus in the first embodiment of the invention;

FIG. 4 is a state transition diagram of the video transmitting apparatus in the second embodiment of the invention;

DESCRIPTION OF THE EMBODIMENTS

Figure 1:
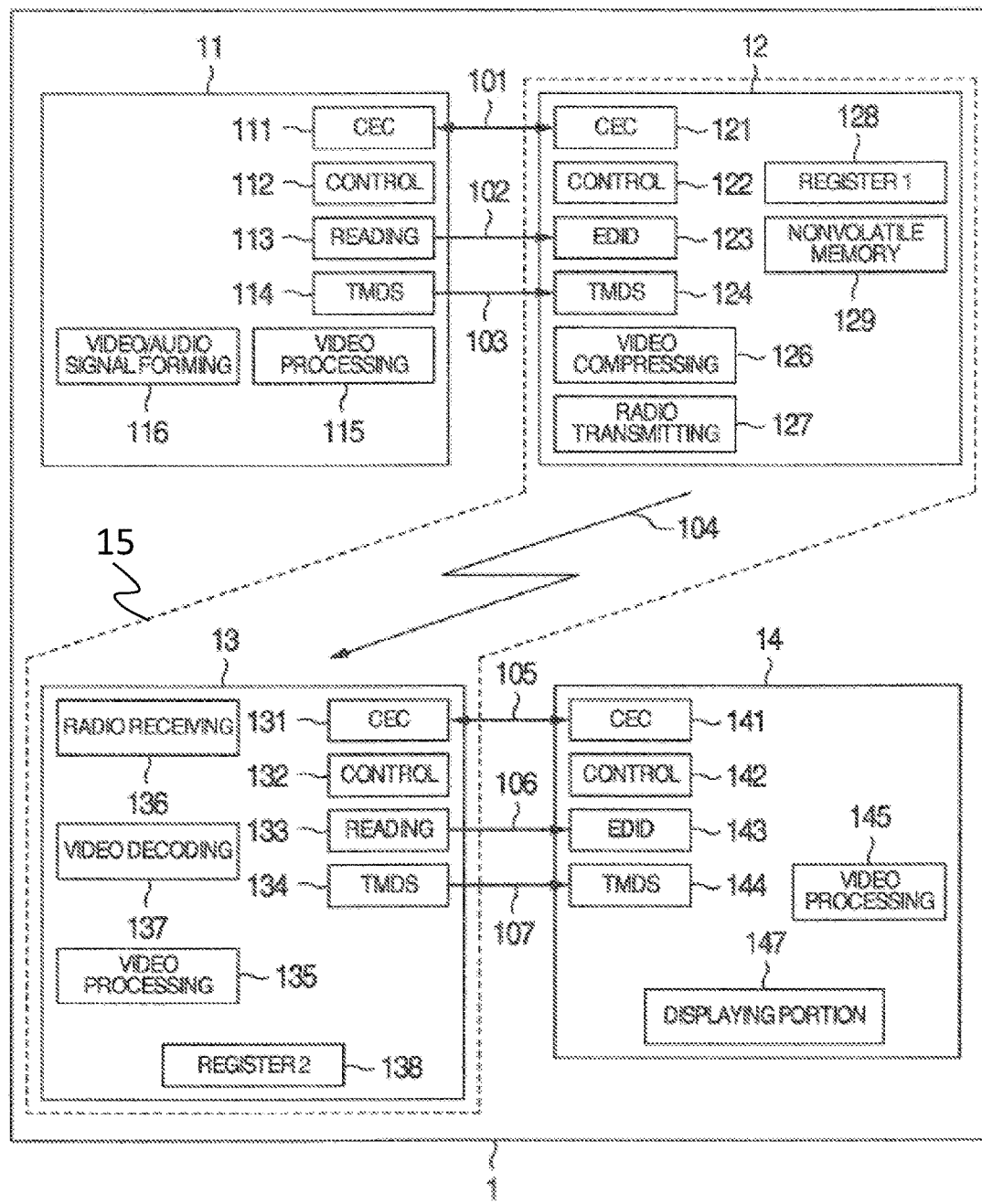
FIG. 1 is a block diagram of a video system comprising a video transmitting apparatus, a video signal source, and a video displaying apparatus according to the first and second embodiments of the invention.

A video transmitting apparatus in the invention will be described hereinbelow with reference to the drawings. In the following embodiments, similar component elements are designated by the same reference numerals.

[Embodiment 1]

FIG. 1 is a block diagram showing a construction of a video display system 1 according to the invention. In FIG. 1, a video transmitting apparatus 15 is constructed by a radio transmitting unit 12 and a radio receiving unit 13 and transmits a video signal which is outputted from a video signal source 11 to a video displaying apparatus 14.

First, a flow of the video signal will be described. The video signal source 11 executes a predetermined scaling process and a picture quality improvement signal process to the video signal formed in a video/audio signal forming portion by a video signal processing portion 115 and, thereafter, the signal is transmitted from a TMDS transmitting portion 114 to a TMDS receiving portion 124 through a line 103. An output of the TMDS receiving portion 124 of the radio transmitting unit 12 is encoded by a video compressing portion 126, a video data amount is compressed, and thereafter, the compressed signal is transmitted from a radio transmitting portion 127 to a radio receiving portion 136 of a radio receiving unit 13 by a radio wave 104.

An output of the radio receiving portion 136 is decoded into a non-compression video signal format by a video decoding portion 137, subsequently, noises or the like caused by the video compression are suppressed in a video processing circuit 135, and thereafter, the output is transmitted from a TMDS transmitting portion 134 to a TMDS receiving portion 144 of the video displaying apparatus 14 through a line 107. An output of the TMDS receiving portion 144 is inputted to a video processing portion 145, is subjected to a signal process according to characteristics of a displaying portion 147, and thereafter, is supplied to the displaying portion 147 and displayed.

Through lines 102 and 106, EDID reading portions 113 and 133 respectively read out data in EDID storing portions 123 and 134 in which the data showing specifications of the radio transmitting unit 12 and the video displaying apparatus 14 has been stored. Owing to such a mechanism, the video signal source 11 and the radio receiving unit 13 can know that the predetermined radio transmitting unit 12 and the video displaying apparatus 14 have directly been connected, respectively. After that, through lines 101 and 105, by using CEC message exchanging functions 111 and 121, 131, and 141, the video signal source 11 and the radio receiving unit 13 notify the radio transmitting unit 12 and the video displaying apparatus 14 that the predetermined video signal source 11 and the radio receiving unit have been connected, respectively, thereby recognizing a fact that the system has a special system connecting configuration in which the predetermined video signal source 11, the video transmitting apparatus 15, and the video displaying apparatus 14 have directly been connected. When such a recognition is established, the video signal processing portion 115 of the video signal source 11 plays a role of such a pre-process as to raise a video compressing efficiency and the video processing portion 145 of the video displaying apparatus 14 suppresses, for example, mosquito noises or the like which are peculiar to the video compression, and integrated high picture quality can be provided.

FIG. 2 is a diagram showing a control sequence among the video signal source 11, radio transmitting unit 12, radio receiving unit 13, and video displaying apparatus 14 in the above embodiment. FIG. 3 is a diagram showing a state transition of the radio transmitting unit 12 (in FIG. 3, it is abbreviated and displayed as Tx) on the left side and a state transition of the radio receiving unit 13 (in FIG. 3, it is abbreviated and displayed as Rx) on the right side.

The grasping operation of the special system connecting configuration in the embodiment of FIG. 1 will be described hereinbelow with reference to both of the state sequence diagram of FIG. 2 and the state transition diagram of FIG. 3.

After a power source was turned on, the radio transmitting unit 12 obtains a connecting state before the power source is turned off from a nonvolatile memory 129 and copies into a first register 128 (311 in FIG. 3). After that, the unit 12 waits until the video signal source 11 starts to supply a +5V power source of DDC (312 in FIG. 3). In response to the start of the supply of +5V of DDC, the first register 128 is reset and, at the same time, "H" is applied to the HPD and the read-out of the EDID storing portion 123 is permitted (211 and 212 in FIG. 2, 313 in FIG. 3). The EDID reading portion 113 of the video signal source 11 reads out the data from the EDID storing portion 143 (213 in FIG. 2). When it is determined from a predetermined manufacture's name, product model number, and the like that the video signal source is a video signal source having a function for assembling a predetermined construction, the EDID reading portion 113 notifies the radio transmitting unit 12 of such a fact by a CEC message (214 in FIG. 2, 314 in FIG. 3) and sets the data in the register 128 (315 in FIG. 3).

Just after the turn-on of the power source, the radio receiving unit 13 resets a second register 138 (321 in FIG. 3) and supplies DDC +5V to the video displaying apparatus 14 (221 in FIG. 2, 322 in FIG. 3). By detecting a change to HPD="H" shown by the video displaying apparatus 14, the EDID reading portion 133 reads data in the EDID storing portion 143 of the video displaying apparatus 14 (223 in FIG. 2, 323 in FIG. 3). When it is determined that the video displaying apparatus is a predetermined video displaying apparatus, the EDID reading portion 133 sets the second register 138 (324 in FIG. 3).

When HPD="L" in the case where the connection of the radio receiving unit 13 and the video displaying apparatus 14 is disconnected, the specification of the video displaying apparatus is changed, or the like, the second register 138 is reset (321 in FIG. 3). The steps of 321 to 324 in FIG. 3 are repeated hereinbelow. In this instance, when a period of time of HPD="L" is so short to be within, for example, about 2 seconds, it is also possible to construct in such a manner that the second register is not reset but the setting state is held and the setting/resetting operation is executed according to a result of the reading of the EDID, thereby avoiding a short state change.

A fact that both of the first register 128 and the second register 138 have been set is recognized in common in the video transmitting apparatus 15 by mutually notifying the states by the radio transmitting unit 12 and the radio receiving unit 13 (215 in FIG. 2), and whether or not the system has the special system configuration can be discriminated.

If the power source of the video signal source is OFF when the power source of the video transmitting apparatus is turned on, DDC +5V is not supplied and an unknown state continues as a connecting state. To avoid such a situation, the nonvolatile memory is used so as to store the state of the register 128 just before the turn-off of the power source.

Since it is generally known that the number of erroneous writing operations increases with an increase in the number of rewriting times of the nonvolatile memory, as a measure for reducing the number of rewriting times, if the writing operation is started only in the case where the state of the first register 128 differs from the stored state in the nonvolatile memory for a predetermined time (for example, 30 seconds) or more, the reliability can be improved. By the above operation, when it is determined that the predetermined video signal source, video transmitting apparatus, and video displaying apparatus have directly been connected, the video transmitting apparatus 15 raises a compression ratio of the video compressing portion 126, allows the video signal processing portion 115 of the video signal source 11 to execute the pre-process by the CEC message so that a video compression ratio can be easily raised, and allows the video processing portion 145 of the video displaying apparatus 14 to execute a filtering process for reducing the noises which are peculiar to the video compression, so that there is such an advantage that the video transmission with the high picture quality can be performed.

It is also possible to construct in such a manner that when it is determined that the predetermined video signal source, video transmitting apparatus, and video displaying apparatus have directly been connected, the exchange of a special CEC message necessary for the interlocking of the high picture quality realizing video processes, the interlocking of the menu displays, the interlocking of the apparatus states such as power ON/OFF, and the like among those three apparatuses is permitted. When the above direct connection is not confirmed, if such a special CEC message is outputted, there is a possibility that it becomes a CEC busneck and exerts an influence on other CEC message control. By confirming the above direct connection, there is an effect of preventing such an influence.

Since a problem such as a timing delay or the like is liable to occur at the time of the radio transmission of the CEC message, the CEC message transmission dares to be stopped and the CEC transmitting function can be used only at the time of the direct connection.

[Embodiment 2]

An embodiment using a state transition diagram of FIG. 4 in place of the state transition diagram of FIG. 3 in the video transmitting apparatus shown in the video system block diagram of FIG. 1 is shown.

It is an object to reduce the surplus CEC message transmission when the CEC message is stopped in the case where the video signal source, video transmitting apparatus, and video displaying apparatus are not in the predetermined direct connecting state. The same operation portions as those in the state transition diagram of FIG. 3 are designated by the same reference numerals and their operation explanation is omitted. Additional portions will be described hereinbelow also with reference to FIG. 1. If such a rule that when the predetermined video signal source 11 outputs the CEC message, DDC +5V is certainly supplied is preliminarily determined, in the case where the radio transmitting unit 12 receives the message before DDC +5V is supplied in the state 312, it is possible to determine that the predetermined video signal source is not connected. Therefore, even in the case where the first and second registers were set and the CEC message transmission has been permitted, a CEC communicating portion 121 resets the first register 128 (411 in FIG. 4) without making a response and continues the DDC +5V standby state 312.

In the case where the first and second registers were set and the CEC message transmission has been permitted in the state 312, if the CEC message is sent to a CEC communicating portion 131 of the radio receiving unit 13, it is radio-transmitted to the radio transmitting unit 12 and transferred from the CEC communicating portion 121 to a CEC communicating portion 111 of the video signal source 11 (state 412 in FIG. 4). The transferring operation is repeated a predetermined number of times (twice in FIG. 4), thereby enabling the CEC message to be certainly transferred. Also in order to prevent a surplus CEC command from being issued, it is also possible to set so that the CEC message is not automatically transmitted again even in the case where the CEC communicating portion 111 cannot receive it.

The radio receiving unit 13 is also additionally provided with such a function that if the predetermined EDID cannot be read out for the state 324 in FIG. 3, the register is reset.

The case where the video transmitting apparatus for transferring the CEC command only in the case of the combination of the predetermined video signal source, video transmitting apparatus, and video displaying apparatus erroneously transmits the surplus CEC message as mentioned above can be suppressed.

[Embodiment 3]

Figure 5:
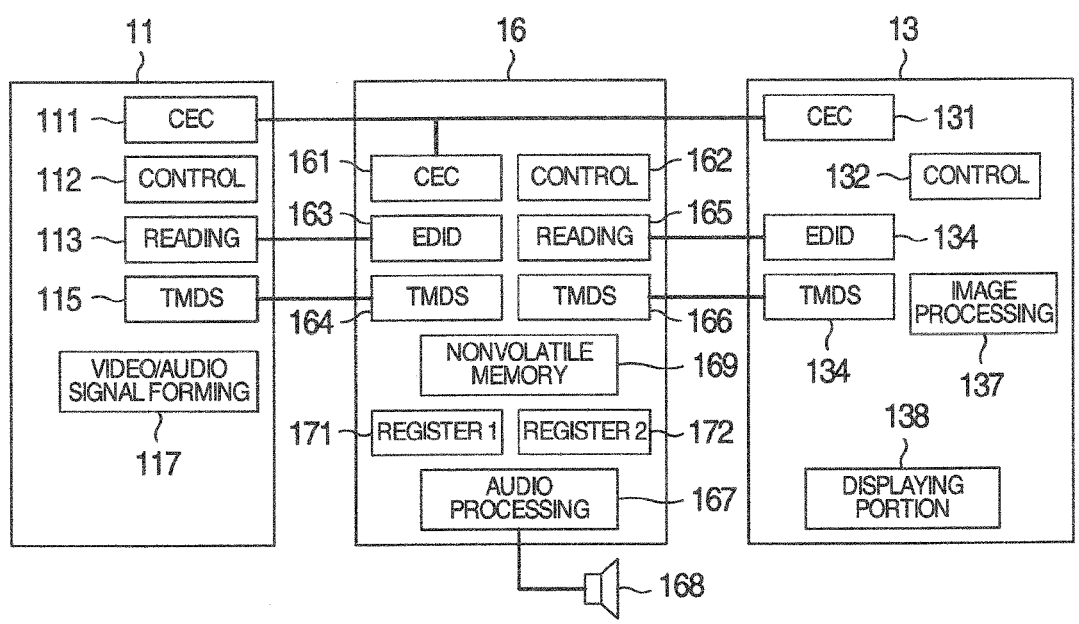
FIG. 5 is block diagram of a video system comprising a video transmitting apparatus, a video signal source, and a video displaying apparatus according to the third embodiment of the invention.

A system block diagram according to the third embodiment of the invention is shown in FIG. 5. The same component elements as those in FIG. 1 are designated by the same reference numerals. Reference numeral 16 denotes a video transmitting apparatus with an audio processing function. An audio processing portion 167, a speaker 168, and the like are connected to the video transmitting apparatus. After the direct connection of the predetermined video signal source, video transmitting apparatus, and video displaying apparatus was detected, the interlocking operations among the directly connected apparatuses are realized on the basis of a predetermined operating procedure.

As an example of those interlocking operations, such an application that a powerful scene is detected in the video process and an audio process is interlocking-controlled according to the scene or the like is considered. There is also such an application that the stereoscopic audio reproducing and video display are executed in the case of a combination in which the video signal source has stereoscopic video contents, the video transmitting apparatus with the audio processing function can reproduce a stereoscopic sound, and the video displaying apparatus can display a stereoscopic video image.

In a video transmitting apparatus having the radio video transmitting function or the like, there is such an advantage that a video transmitting function of high picture quality and a high efficiency in the case where the predetermined video signal source and the video displaying apparatus are combined and a standard video transmitting function in combinations other than the predetermined combination can be properly switched.

There is such an advantage that the special control signal transmitting function can be provided only in the case where the predetermined video signal source and the video displaying apparatus are combined.

The video transmitting apparatus according to the invention can accurately discriminate the combination of the predetermined video signal source and the video displaying apparatus and can realize the high picture quality radio video transmission, the special control signal transmitting function, and the video signal process.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A radio transmitting system for transmitting and receiving a video signal, comprising:
a radio transmitter configured to wirelessly transmit the video signal;
a radio receiver configured to wirelessly receive the video signal from the radio transmitter;
a video signal source coupled to the radio transmitter through a first HDMI (High Definition Multimedia Interface cable; and
a video display apparatus coupled to the radio receiver through a second HDMI cable,
wherein the radio transmitter is further configured to determine whether the video signal source has a CEC (Consumer Electronics Control) communication function or not;
wherein the radio receiver is further configured to determine whether the video display apparatus has the CEC communication function or not;
wherein, when the radio transmitter determines that the video signal source has the CEC communication function and the radio receiver determines that the video display apparatus has the CEC communication function, the radio transmitter wirelessly transmits the CEC message received from the video signal source via the first HDMI cable to the radio receiver and the radio receiver wirelessly transmits the CEC message received from the video display apparatus via the second HDMI cable to the radio transmitter;
wherein, when the radio transmitter determines that the video signal source does not have the CEC communication function or the radio receiver determines that the video display apparatus does not have the CEC communication function, the radio transmitter does not transmit the CEC message received from the video signal source via the first HDMI cable to the radio receiver and the radio receiver does not transmit the CEC message received from the video display apparatus via the second HDMI cable to the radio transmitter.

2. The transmitting system according to claim 1, wherein the radio transmitter includes a first controller configured to determine whether the video signal source has the CEC communication function or not, and
wherein the radio receiver includes a second controller configured to determine whether the video display apparatus has the CEC communication function or not.

3. The transmitting system according to claim 2, wherein the first controller is configured to determine whether the video signal source has the CEC communication function or not based on a communication with the video signal source via the first HDMI cable, and the communication is performed based on an EDID (Extended Display Identification Data) of the radio transmitter, and
wherein the second controller is configured to determine whether the video display apparatus has the CEC communication function or not based on an EDID (Extended Display Identification Data) received from the video display apparatus via the second HDMI cable.

* * * * *